US012591503B2

(12) United States Patent
Haughton

(10) Patent No.: US 12,591,503 B2
(45) Date of Patent: Mar. 31, 2026

(54) DEBUGGING INSTRUCTION EXECUTION ERRORS IN A SIMULATED COMPUTER SYSTEM

(71) Applicant: Arm Limited, Cambridge (GB)

(72) Inventor: John David Haughton, Cambridge (GB)

(73) Assignee: ARM LIMITED, Cambridge (GB)

( * ) Notice: Subject to any disclaimer, the term of this patent is extended or adjusted under 35 U.S.C. 154(b) by 184 days.

(21) Appl. No.: 18/545,177

(22) Filed: Dec. 19, 2023

(65) Prior Publication Data

US 2025/0199940 A1     Jun. 19, 2025

(51) Int. Cl.
*G06F 11/362*          (2025.01)
(52) U.S. Cl.
CPC ................................ *G06F 11/3628* (2013.01)
(58) Field of Classification Search
None
See application file for complete search history.

(56) References Cited

U.S. PATENT DOCUMENTS

2004/0117747 A1* 6/2004 Chen ...................... G06F 30/33
                                                    716/106
2007/0157138 A1* 7/2007 Ciolfi .................. G06F 30/3323
                                                    716/136

2008/0215920 A1* 9/2008 Mayer ..................... G06F 11/28
                                                    714/38.1
2022/0405242 A1* 12/2022 Mittelstaedt ............ G06F 16/58

FOREIGN PATENT DOCUMENTS

| CN | 111931191 A | * 11/2020 | .......... G06F 21/577 |
| CN | 113612565 A | * 11/2021 | .......... H04J 3/0617 |
| CN | 120256212 A | * 7/2025 | |
| JP | 2002515999 A | * 5/2022 | ......... G06F 11/3664 |
| WO | WO-2017139010 A2 | * 8/2017 | ......... G06F 12/1408 |

* cited by examiner

*Primary Examiner* — Philip Wang
(74) *Attorney, Agent, or Firm* — Talem IP Law, LLP

(57)                    ABSTRACT

A method to debug instruction execution errors in a simulated computer system is provided. The method includes generating two separate simulations of the same system and causing a code including a set of instructions to execute on the two separate simulations. The computer implemented method further includes performing an efficient trace operation starting from a start instruction to an end instruction of the set of instructions on the two separate simulations. When trace operation is performed, an instruction execution deviation is identified between the code executed in the two separate simulations by comparing checksum values at a reporting frequency, determining that the comparison of the checksum values indicates a mismatch, and using instruction count and the reporting frequency to capture at least one instruction leading up to the instruction execution deviation.

19 Claims, 7 Drawing Sheets

GENERATE TWO SEPARATE SIMULATIONS OF A SAME SYSTEM 202

CAUSE A SET OF INSTRUCTIONS OF A CODE TO EXECUTE ON THE TWO SEPARATE SIMULATIONS 204

PERFORM A TRACE OPERATION STARTING FROM A START INSTRUCTION TO AN END INSTRUCTION OF THE SET OF INSTRUCTIONS ON THE TWO SEPARATE SIMULATIONS 206

IDENTIFY AN INSTRUCTION EXECUTION DEVIATION BETWEEN THE CODE EXECUTED INAT THE TWO SEPARATE SIMULATIONS BY 208

COMPARE CHECKSUM VALUES AT A REPORTING FREQUENCY 210

DETERMINE THAT THE COMPARISON OF THE CHECKSUM VALUES INDICATES A MISMATCH 212

USING INSTRUCTION COUNT AND THE REPORTING FREQUENCY TO CAPTURE INSTRUCTIONS LEADING UP TO THE INSTRUCTION EXECUTION DEVIATION 214

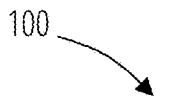
100
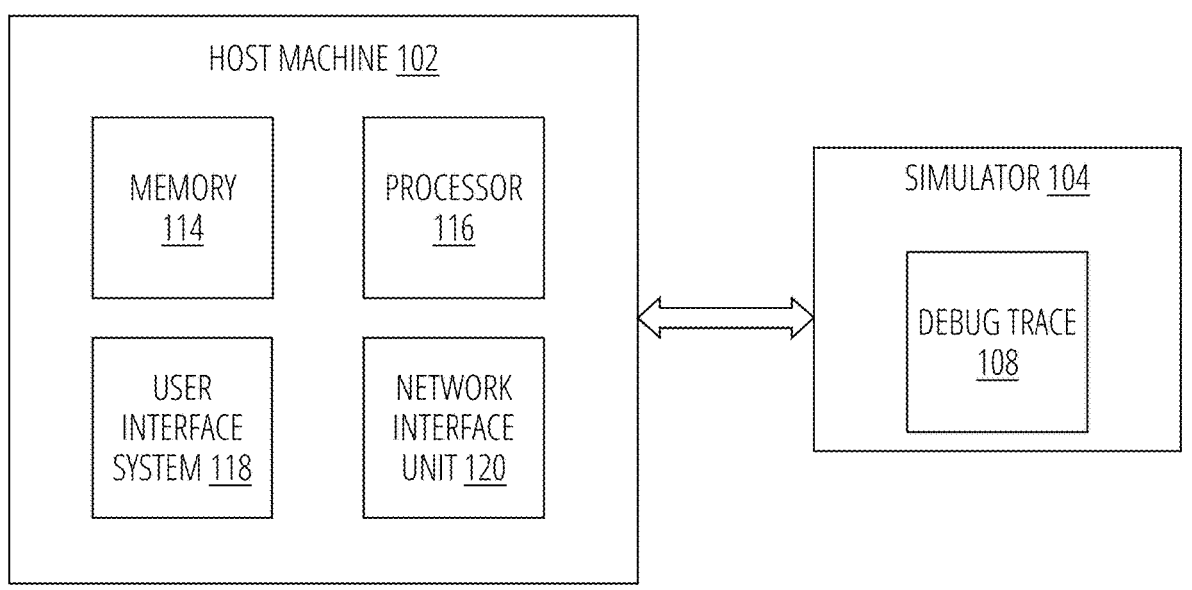
HOST MACHINE 102
MEMORY
114
PROCESSOR
116
USER
INTERFACE
SYSTEM 118
NETWORK
INTERFACE
UNIT 120
SIMULATOR 104
DEBUG TRACE
108
FIG. 1

GENERATE TWO SEPARATE SIMULATIONS OF A SAME SYSTEM 202

CAUSE A SET OF INSTRUCTIONS OF A CODE TO EXECUTE ON THE TWO SEPARATE SIMULATIONS 204

PERFORM A TRACE OPERATION STARTING FROM A START INSTRUCTION TO AN END INSTRUCTION OF THE SET OF INSTRUCTIONS ON THE TWO SEPARATE SIMULATIONS 206

IDENTIFY AN INSTRUCTION EXECUTION DEVIATION BETWEEN THE CODE EXECUTED INAT THE TWO SEPARATE SIMULATIONS BY 208

COMPARE CHECKSUM VALUES AT A REPORTING FREQUENCY 210

DETERMINE THAT THE COMPARISON OF THE CHECKSUM VALUES INDICATES A MISMATCH 212

USING INSTRUCTION COUNT AND THE REPORTING FREQUENCY TO CAPTURE INSTRUCTIONS LEADING UP TO THE INSTRUCTION EXECUTION DEVIATION 214

FIG. 2

DEBUGGING INSTRUCTION EXECUTION ERRORS IN A SIMULATED COMPUTER SYSTEM

BACKGROUND

A debug trace feature is code added to a software application that helps the application's developers find software errors in the application by generating a trace describing the application's internal behavior. Applications can be developed that are software models of computer hardware, such as a processor. Such software models simulate the execution of every instruction that would be executed on the hardware. Simulations utilizing these software models can then be performed to gauge the behavior of the hardware prior to the release of the hardware, for example.

Modern computer systems can execute many billions of instructions per second. Thus, typical computer processes like the boot, e.g., the startup sequence, of an operating system on a computer system can involve the execution of hundreds of billions of instructions. The use of a computer system simulation to study or validate the design and behavior of a modern computer system using typical workloads such as the operating system boot is extremely complex, as it involves simulating the execution of hundreds of billions of instructions. For the developer of the simulation software, finding and debugging a simulation error that may occur in the simulation of a single instruction out of hundreds of billions is extremely challenging.

BRIEF SUMMARY

Methods to debug instruction execution errors in a simulated computer system are described. A computer system simulator, which can be embodied as instructions stored on a computer readable storage medium, can, when executed by a computing system, simulate the execution of a guest software, e.g., the workload, on a specific processor and platform. A debug trace operation can be added to the simulator and enabled when the simulator is running to identify deviations in the execution of the same guest software on different versions of the simulator code. The trace operation provides an ongoing record of simulated hardware and software events, e.g., instructions of code, that occur during execution of code instructions, that occur during the simulation of the guest code.

A computer implemented method is provided. The computer implemented method includes the steps of generating two separate simulations of the same system and causing a code comprising a set of instructions to execute on the two separate simulations. The computer implemented method further includes performing a trace operation starting from a start instruction to an end instruction of the set of instructions on the two separate simulations. When trace operation is performed, an instruction execution deviation is identified between the code executed in the two separate simulations by comparing checksum values at a reporting frequency, determining that the comparison of the checksum values indicates a mismatch, and using instruction count and the reporting frequency to capture at least one instruction leading up to the instruction execution deviation.

A computer system simulator, which can be embodied as instructions stored on a computer-readable storage medium, can, when executed by a computing system, direct the computer system to generate two separate simulations of the same system and cause a code comprising a set of instructions to execute on the two separate simulations. The computer system is then directed to perform a trace operation starting from a start instruction to an end instruction of the set of instructions on the two separate simulations. With the trace operation enabled, the computer system is further directed to accumulate a first checksum value for each instruction executed in a first simulation of the two separate simulations, accumulate a second checksum value for each instruction executed in a second simulation of the two separate simulations, and report at a reporting frequency, for each of the first simulation and the second simulation a partial total first checksum value of the accumulated first checksum value, a partial total second checksum value of the accumulated second checksum value respectively, and an instruction count. For each reported instruction, the computer system is directed to compare the partial total first checksum value with the partial total second checksum value. In response to the comparison that the partial total first checksum value does not equal the partial total second checksum value, set the start instruction to the instruction count minus the reporting frequency and the end instruction to the instruction count, and when the start instruction is one greater than the end instruction, generate a notification of the instruction execution deviation that includes a final checksum report.

Advantageously, the proposed methods can quickly and easily find unexpected deviations in the execution of two separate simulations of the same system executing different versions of the simulator code that are expected to behave identically when running the same guest software. In addition, the simulation with the tracing feature turned on, as defined by the proposed method, runs faster than traditional instruction tracing performed in simulations. The checksum algorithm utilized in the method is computationally simple so that it does not take up much time to perform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates an example operating environment.

FIG. 2 illustrates a method of debugging instruction execution errors in a simulated computer system.

DETAILED DESCRIPTION

Figure 3:
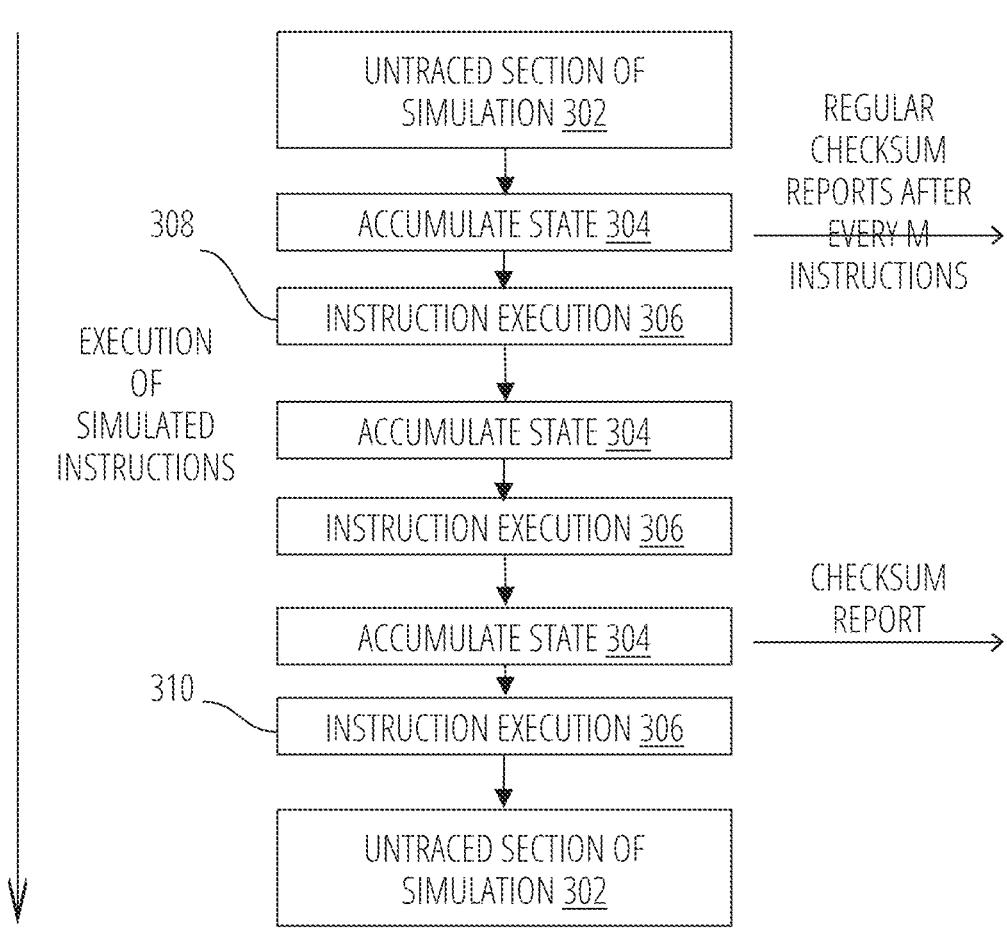
FIG. 3 illustrates a representation of an implementation of the method executing simulated instructions of code.

Methods to debug instruction execution errors in a simulated computer system are described. A computer system simulator is a software tool that simulates one or more specific system architectures. That is, a computer system simulator enables a particular system architecture to be simulated on a host system so that software designed for a different system architecture can be run on the host.

One use of computer system simulators is for analyzing specific aspects of runtime behavior of a particular system architecture. This use of a computer system simulator is beneficial in development environments where the particular system architecture of interest is not present, for example when the actual hardware is not yet available. In addition, the use of a computer system simulator can provide information concerning the internal behavior of the simulated computer system that would not be available using the actual hardware.

For example, a key sub-component in a computer system simulation is software that simulates the behavior of a physical computer processor. In such a simulator, for each machine instruction that would be executed, actions semantically comparable to the guest instructions are executed on the host processor. Thus, if one wants to simulate a particular instruction exactly in a simulator for validation purposes or for software checking, the simulator should match the numeric output of the hardware.

A type of computer system simulator is one that performs dynamic binary translation. Dynamic binary translation is a process of translating binaries (the machine code) from one instruction set architecture to another or within the same instruction set architecture. For example, the system simulator may include a simulation compiler that translates a target code into a host code. An example system simulator that performs dynamic binary translation is the FAST MODEL from ARM Limited. Another type of computer system simulator is an interpreter. The proposed method can be performed on both types of system simulators.

A challenge when debugging the code that implements a computer system simulator is that simulating the execution of the guest software may involve simulating the execution of hundreds of billions of instructions. For the developer of the simulation software, finding and debugging a simulation error that may occur in the simulation of a single instruction out of hundreds of billions is extremely challenging.

An approach to debugging the simulated execution of large workloads, e.g., involving the simulation of one million instructions to a one hundred billion instructions or more, is to try to identify the first simulated instruction that behaves differently, e.g., an instruction execution deviation, between two runs of the of the simulator code with the same guest software. In order to find the deviation, the software developer can compare a run of the guest software on a first version of the simulator code that works as intended with a run of the guest software on a second version of the simulator code that's had a change made to it, that doesn't work as intended. For example, when running the boot code of the operating system, e.g., the workload, on the first version of the simulator, the boot process completes successfully while when running the boot code on the second version of the simulator, the boot process fails to complete successfully.

Most computer system simulators have a facility for tracing each simulated instruction executed. Comparing the simulated instruction trace stream from two different simulator runs can be used to debug an error in instruction simulation by finding the first mismatch in the trace streams. However, with hundreds of billions of instructions being simulated, the total time cost of generating and comparing the trace for each instruction simulated is so large as to make the approach impractical.

FIG. 1 illustrates an example operating environment. Referring to FIG. 1, operating environment 100 includes a host machine 102 having hardware components such as one or more processors 116, memory 114, user interface system 118, and network interface unit 120. The hardware of the host machine 102 executes binaries created for the architecture. The host machine 102 further includes a simulator 104 which runs on one or more processors 116, but fully simulates the behavior of another computing system, e.g., another processor(s), executing a guest binary. The guest binary is a code that runs on the simulator 104. The simulator 104 can include a debug trace 108 feature to enable debugging when the trace is enabled. The debug trace 108 can include instructions as described with respect to method 200 of FIG. 2. The host machine 102 can further include a user interface system 118 which may include input/output (I/O) devices such as a display and components that enable communication between a user and the host machine 102. Host machine 102 may also include a network interface unit 120 that allows the system to communicate with other computing devices, including server computing devices and other client devices, over a network.

FIG. 2 illustrates a method of debugging instruction execution errors in a simulated computer system. Referring to FIG. 2, method 200 may begin by generating (202) two separate simulations of a same system. The system can include a model of a processor architecture, for example. In some cases, the system can include a model having multiple processors. Additionally, the system can include models of other computing components that make up a computing system including one or more of a memory device, e.g., FLASH, DRAM, ROM, etc., a peripheral device, e.g., storage devices, display devices, a peripheral interface, user input devices, as well as system devices such as buses, memory management units, interconnects, timers, clocks, GPUs, caches, etc. Method 200 further includes causing (204) a code comprising a set of instructions, e.g., the guest code, to execute on the two separate simulations. The two separate simulations executing the guest code can include a first version that executes without issue while a second version, e.g., the first version with some changes, of the same simulation running the same guest code crashes when the simulation executes. The two versions can execute separately by the simulator 104 on host machine 102.

Method 200 includes performing (206) a trace operation starting from a start instruction to an end instruction of the set of instructions. The start instruction and end instruction define instruction counts where the debug trace operation is enabled. In this way, the debug trace operation does not have to be performed on the entire code of the simulation which can take a long period of time. For example, a first run of method 200 can be performed to trace a larger section of the code when the code is first simulated to progressively smaller sections of the code in an iterative process to narrow down to precisely the first simulated instruction that is behaving differently.

Method 200 further includes identifying (208) an instruction execution deviation between code executed in the two separate simulations during performing the trace operation. The identifying (208) is accomplished by comparing (210) checksum values at a reporting frequency, determining (212) that the comparison of the checksum values indicates a mismatch, and using (214) instruction count and the reporting frequency to capture instructions leading up to the instruction execution deviation.

FIG. 3 illustrates a representation of an implementation of the method executing simulated instructions of code. In the shown implementation, the method has been configured to start and stop at specific simulated instruction counts, e.g., beginning at start instruction 308 and stopping at end instruction 310. In the illustrated case, the start instruction 308 and end instruction 310 define a section of the code to be debug traced such that there are untraced sections of simulation 302.

In some cases, comparing (210) the checksum values at a reporting frequency can include accumulating a first checksum value for each instruction executed of a first simulation of the two separate simulations and accumulating a second checksum value for each instruction executed of a second simulation of the two separate simulations. Referring back to FIG. 3, for each instruction execution 306 within the defined section of the simulation, e.g., between the start instruction 308 and the end instruction 310, a value describing a state of the simulation is added to a single accumulator in the accumulate state 304 to provide a checksum value. The accumulating in the accumulate state 304 is performed before the simulation of each instruction as illustrated in FIG. 3.

The state of the simulation can be described using a plurality of indicators. A value for each of the plurality of indicators at the instruction count is summed and added to the checksum value. The plurality of indicators can include one or more of the current instruction address, the instruction opcode (the executed instruction itself), general purpose registers, vector floating point registers, and condition flags. Each of the plurality of indicators has been chosen as a deviation of one of these indicator values in the first simulation from the second simulation can indicate an error. For example, when one of the two simulations executes an instruction at a different address for a given instruction count, an error can be indicated. In another example, when the two simulations execute different opcodes for the same instruction count that can also indicate an error.

In the actual system, when instructions are executed, the instruction may include a read or write to a register that is internal to the processor. In the simulated system, the register states, e.g., general purpose registers, vector floating point registers, and condition flags are all simulated. Condition flags are values that indicate that a certain condition has been met. These Boolean values can also be written to registers which are simulated. Thus, modifications to the register states in different ways between the two simulations can indicate an error. Thus, even though the instruction may be executing at the same address with the same instruction opcode, checking all the register values will check that the functionality implemented by the instruction is correct.

Figure 4:
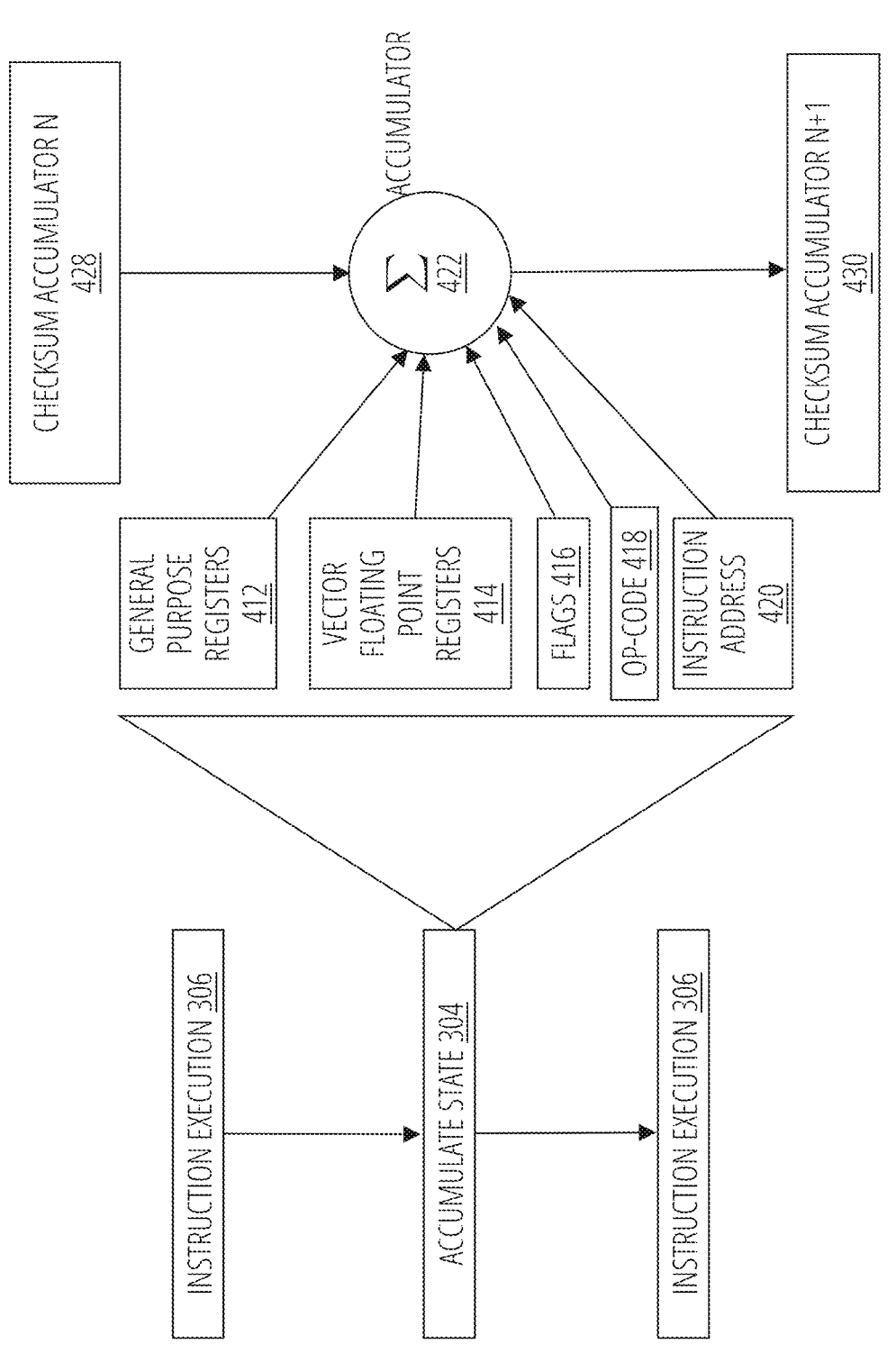
FIG. 4 illustrates a representation of an implementation of the accumulating in the accumulate state.

FIG. 4 illustrates a representation of an implementation of the accumulating in the accumulate state 304. In the accumulate state 304, the value of each of plurality of indicators, e.g., each of the general purpose registers 412, each of the vector floating point registers 414, each of the flags 416, the instruction opcode 418 and the instruction address 420, are summed by accumulator 422 and added to the checksum value of the checksum accumulator n 428 from the previous accumulate state 304. The checksum value after the summing will then be carried to the next accumulate state as checksum accumulator n+1 430. In some cases when the simulated computer system includes multiple processors, a shared accumulator 422 can be utilized to accumulate all the accumulated checksum values from all the processors.

Referring back to FIG. 3, the accumulated checksum value from the accumulate states 304 can be reported at a reporting frequency. The accumulated checksum value can be reported at a reporting frequency of every M instructions so that the tracing information provides the information needed to quickly debug the code but doesn't report on every instruction count. For example, the reporting frequency M can be set to 1000 so that after every 1000 instructions executed, the accumulated checksum value is reported. The reporting at the reporting frequency can include, for each of the first simulation and the second simulation, a partial total first checksum value of the first accumulated checksum value and a partial total second checksum value of the second accumulated checksum value, respectively, and the instruction count. In some cases, the tracing information at the reporting frequency can also include the instruction address 420, the instruction opcode 418, and a disassembly of the instruction. In some cases, the reporting can include generating a checksum report with the reported information. The generated checksum report can be available for display at the display of a user's computing system, e.g., host machine 102.

Figure 5:
FIG. 5 illustrates an example of a final checksum report.

FIG. 5 illustrates an example of a checksum report. In some cases, the checksum report 500 can be displayed on the display of a computing system, e.g., host machine 102 as shown in FIG. 5. The checksum report 500 includes the instruction count displayed on the left side of the computer display in FIG. 5. In the illustrated example, the reporting frequency is 100,000,000 instructions. Thus, for each instruction count, the partial total checksum value is displayed along with the instruction address, and a disassembly of the instruction.

For each reported instruction count, the comparing (210) further includes comparing the partial total checksum value of the accumulated first checksum value with a partial total checksum value of the accumulated second checksum value. When the first partial total checksum value of the accumulated first checksum value and the second partial total checksum value of the accumulated second checksum value are not equal, it is determined (212) that the comparison of the checksum values indicates a mismatch.

In response to a mismatch, the range of instructions can be narrowed down, and the reporting frequency can be increased to home in on the precise first instruction execution deviation. In particular, the start instruction can be set to the instruction count where the mismatch occurred minus the reporting frequency and the end instruction to the instruction count where the mismatch occurred. Method 200 can then be repeated with the new start instruction and end instruction at the increased reporting frequency.

In response to the case that the partial total checksum value of the accumulated first checksum value and the second partial total checksum value of the accumulated second checksum value are equal; the start instruction and the end instruction can be set to define a new section of the code to be traced. Method 200 can then be rerun. In addition, it can be reported that a deviation was not found in the iteration.

Figure 6:
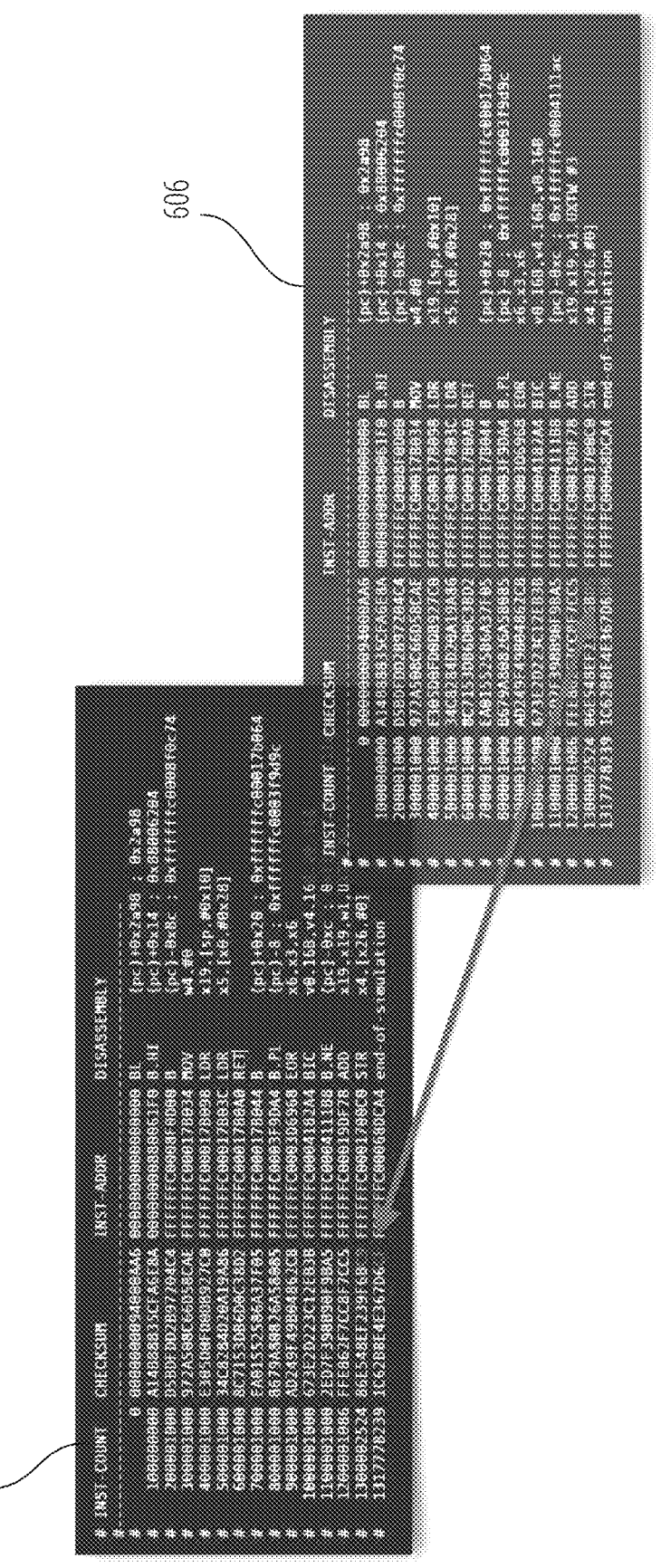
FIG. 6 illustrates an example of a comparison of two checksum reports.

FIG. 6 illustrates an example of a comparison of two checksum reports. Referring to FIG. 6, a first final checksum report 604 from a first simulation and a second final checksum report 606 from a second simulation is shown. The comparison, as shown in FIG. 6, begins at start instruction 0 and finishes at end instruction 1,317,778,239. For each reported instruction count between the start instruction and the end instruction, the first checksum value and the second checksum value are compared. In the illustrated example of FIG. 6, it can be seen that a mismatch indicating an error, e.g., the first instruction execution deviation, exhibits after 1.2 billion instructions into the execution between instruction count 1,200,001,086 and 1,300,002,524.

In order to identify where the first instruction execution deviation occurs, the instruction count, and the reporting frequency can be used (214) to capture instructions leading up to the instruction execution deviation in an iterative manner. For example, the start instruction for the next iteration can be set to the instruction count where the mismatch occurred minus the reporting frequency of the current simulation and the end instruction can be set to the instruction count for another run of method 200. In the illustrated example of FIG. 6, a start instruction would then be 1,200,001,086 and the new end instruction would be 1,300,002,524. Method 200 can then be performed again with the new start instruction and new end instruction with an increased reporting frequency of, for example, 1,000,000 instructions. Method 200 can be performed iteratively until the start instruction is one greater than the end instruction. At this point, the precise location, e.g., the instruction, with the error is identified.

Figure 7:
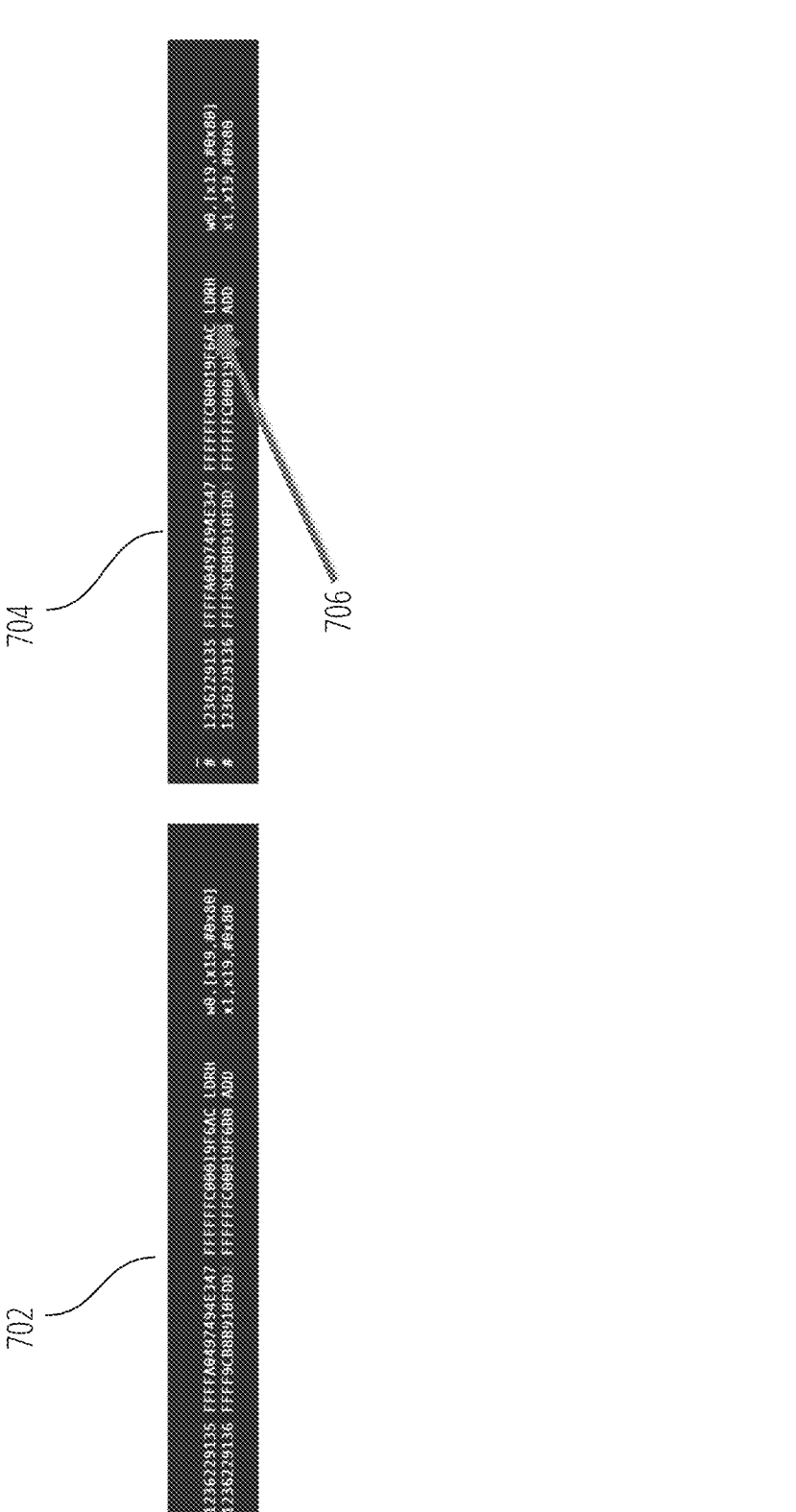
FIG. 7 illustrates an aspect of the subject matter in accordance with one embodiment.

FIG. 7 illustrates a further example of a comparison of two checksum reports. FIG. 7 illustrates the penultimate iteration of the previous example, as shown in FIG. 6, when the instruction reporting frequency has been increased to 1. Referring to FIG. 7, a first final checksum report 702 from a first simulation and a second final checksum report 704 from a second simulation is shown. In this case, the end instruction is one more than the start instruction and the error is located at instruction count 1,236,229,135. The instance of LDRH has provoked the error. The instruction at this count has been dissembled as "LDRH w0, [×19,#0x80] and the simulation of this instance of the LDRH instruction is the cause of the checksum deviation and the point inside the simulator software where the error has occurred. This is the key information in identifying the reason for the error so that the developer can fix the error. A notification can then be generated with a final checksum report. The final checksum report can include the value of each of the plurality of indications, e.g., each register value, the opcode, condition flags, instruction address, etc. that is included in the checksum values. This information will assist the developer find and fix the error.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A computer implemented method, comprising:
generating two separate versions of a simulator code of a same system, the two separate versions being different builds that are expected to behave identically with a given workload;
causing a code comprising a set of instructions, which is the given workload, to execute on the two separate versions of the simulator code;
performing a trace operation starting from a start instruction to an end instruction of the set of instructions on the two separate versions of the simulator code;
during performing the trace operation, identifying an instruction execution deviation between the code executed in the two separate versions by:
comparing checksum values at a reporting frequency to obtain a partial total first checksum value, a partial total second checksum value, and an instruction count:

determining that the comparison of the checksum values indicates a mismatch;
using instruction count and the reporting frequency to capture at least one instruction leading up to the instruction execution deviation; and
for each reported instruction count:
comparing the partial total second checksum value with the partial total first checksum value;
in response to the comparison that the partial total first checksum value does not equal the partial total second checksum value:
setting the start instruction to the instruction count minus the reporting frequency and the end instruction to the instruction count; and
when the end instruction is one greater than the start instruction, generate a notification of the instruction execution deviation that includes a final checksum report.

2. The computer implemented method of claim 1, wherein comparing checksum values at the reporting frequency includes accumulating a first checksum value for each instruction executed of a first simulation of a first of the two separate versions and accumulating a second checksum value for each instruction executed of a second simulation of a second of the two separate versions.

3. The computer implemented method of claim 2, wherein accumulating the first checksum value for each instruction comprises summing a value of a plurality of indicators of a state of the first simulation and adding the sum to the first checksum value, and
wherein accumulating the second checksum value for each instruction comprises summing a value of a plurality of indicators of a state of the second simulation and adding the sum to the second checksum value.

4. The computer implemented method of claim 3, wherein the plurality of indicators for each of the state of the first simulation and the state of the second simulation includes one or more of a current instruction address, general purpose registers, vector floating point registers, condition flags, and an instruction opcode.

5. The computer implemented method of claim 2, further comprising reporting at the reporting frequency the partial total first checksum value of the accumulated first checksum value and the instruction count in a first checksum report and reporting at the reporting frequency the partial total second checksum value of the accumulated second checksum value and the instruction count in a second checksum report.

6. The computer implemented method of claim 1, wherein the generated final checksum report includes the instruction count, instruction address, each register value, an instruction opcode, and each condition flag for each of the start instruction and the end instruction.

7. The computer implemented method of claim 1, wherein setting the start instruction to the instruction count minus the reporting frequency and the end instruction to the instruction count further includes setting the reporting frequency to an increased value.

8. The computer implemented method of claim 1, wherein a number of instructions of the set of instructions of the code is one million to one hundred billion instructions.

9. The computer implemented method of claim 1, wherein the code that executes on the two separate versions is a boot process of a processor.

10. The computer implemented method of claim 1, wherein the system includes one or more processors.

11. The computer implemented method of claim 1, wherein the method is performed during dynamic binary translation.

12. The computer implemented method of claim 1, wherein the method is performed during interpretation.

13. A non-transitory computer-readable storage medium having instructions stored thereon for a simulated computer system that when executed by a computing system directs the computing system to:

generate two separate simulations of a same system;

cause a code comprising a set of instructions to execute on the two separate simulations;

perform a trace operation starting from a start instruction to an end instruction;

accumulate a first checksum value for each instruction executed in a first simulation of the two separate simulations;

accumulate a second checksum value for each instruction executed in a second simulation of the two separate simulations;

report at a reporting frequency, for each of the first simulation and the second simulation a partial total first checksum value of the accumulated first checksum value, a partial total second checksum value of the accumulated second checksum value respectively, and an instruction count;

for each reported instruction count:

compare the partial total first checksum value with the partial total second checksum value;

in response to the comparison that the partial total first checksum value does not equal the partial total second checksum value:

set the start instruction to the instruction count minus the reporting frequency and the end instruction to the instruction count, and when the end instruction is one greater than the start instruction, generate a notification of an instruction execution deviation that includes a final checksum report.

14. The non-transitory computer-readable storage medium of claim 13, wherein accumulating the first checksum value for each instruction comprises summing a value of a plurality of indicators of a state of the first simulation and adding the sum to the first checksum value, and wherein accumulating the second checksum value for each instruction comprises summing a value of a plurality of indicators of a state of the second simulation and adding the sum to the second checksum value.

15. The non-transitory computer-readable storage medium of claim 14, wherein the plurality of indicators includes one or more of a current instruction address, general purpose registers, vector floating point registers, condition flags, and an instruction opcode.

16. The non-transitory computer computer-readable storage medium of claim 13, wherein the code that executes on the two simulations is a boot process of a processor.

17. The non-transitory computer computer-readable storage medium of claim 13, wherein a number of instructions of the set of instructions is one million to one hundred billion instructions.

18. The non-transitory computer computer-readable storage medium of claim 13, wherein in response to the comparison that the partial total first checksum value equals the partial total second checksum value, the execution of the instructions further directs the computing system to:

set the start instruction and the end instruction to define a new section of the code.

19. A computer implemented method, comprising:

generating two separate simulations of a same system;

causing a code comprising a set of instructions to execute on the two separate simulations;

performing a trace operation starting from a start instruction to an end instruction of the set of instructions on the two separate simulations;

during performing the trace operation, identifying an instruction execution deviation between the code executed in the two separate simulations by:

comparing checksum values at a reporting frequency, which comprises accumulating a first checksum value for each instruction executed of a first simulation of the two separate simulations and accumulating a second checksum value for each instruction executed of a second simulation of the two separate simulations;

determining that the comparison of the checksum values indicates a mismatch; and using instruction count and the reporting frequency to capture at least one instruction leading up to the instruction execution deviation; and reporting at the reporting frequency a partial total first checksum value of the accumulated first checksum value and the instruction count in a first checksum report and reporting at the reporting frequency a partial total second checksum value of the accumulated second checksum value and the instruction count in a second checksum report.

* * * * *